United States Patent [19]

Fahy et al.

[11] Patent Number: 5,042,315
[45] Date of Patent: Aug. 27, 1991

[54] GEAR MECHANISM

[75] Inventors: Arthur J. Fahy, Double Bay; Neil Gillies, Earlwood, both of Australia

[73] Assignee: IVG Australia Pty. Ltd., New South Wales, Australia

[21] Appl. No.: 415,045

[22] Filed: Sep. 29, 1989

[30] Foreign Application Priority Data

Oct. 20, 1988 [AU] Australia ............................... PJ1059
Jan. 9, 1989 [AU] Australia ............................... PJ2208

[51] Int. Cl.5 ............................................. F16H 57/12
[52] U.S. Cl. ........................................ 74/411; 74/425
[58] Field of Search .................. 74/440, 409, 411, 425

[56] References Cited

U.S. PATENT DOCUMENTS

| | | | |
|---|---|---|---|
| 2,928,288 | 3/1960 | Bliss et al. | 74/411 |
| 3,208,298 | 9/1965 | Pickles | 74/411 |
| 3,213,548 | 10/1965 | Deaton | 74/411 X |
| 3,543,064 | 11/1970 | Holper | 74/411 X |
| 4,443,209 | 4/1984 | Hooker et al. | 74/411 X |

Primary Examiner—Dwight Diehl
Attorney, Agent, or Firm—Dellett, Smith-Hill and Bedell

[57] ABSTRACT

A torque limiting mechanism has two locking members (131, 137) designed to be incapable of transmitting drive between them but having meshing spiral teeth (132, 138). The members are in a rotatable frame (127) and are respectively driven by radially toothed gears (128, 124) having an idler gear (125) between them. One radially toothed gear (124) is splined (at 123) to a section of a drive shaft (110) of reduced diameter so that it twists in torsion when an input driving torque is applied to the shaft (110). Gear lash exists between the radially toothed gears (124, 125 and 128) which is overcome by the twist of the shaft (110) if the applied torque is big enough. When this occurs, synchronous drive from the input shaft (110) is applied to both locking members (131, 137) so that they rotate together. The applied torque necessary to achieve this is determined by the position of one gear (124) on the spline (123) and this is controlled by a lever (114). Until the applied torque overcomes the gear lash, the locking member (131) prevents the locking member (137) from rotating, and the applied torque on the shaft (110) causes the frame (127) to rotate about the axis of the shaft (110) and provide rotational drive to an output shaft (112). The use of similarly operating locking members is described in other applications than torque limiters.

22 Claims, 12 Drawing Sheets

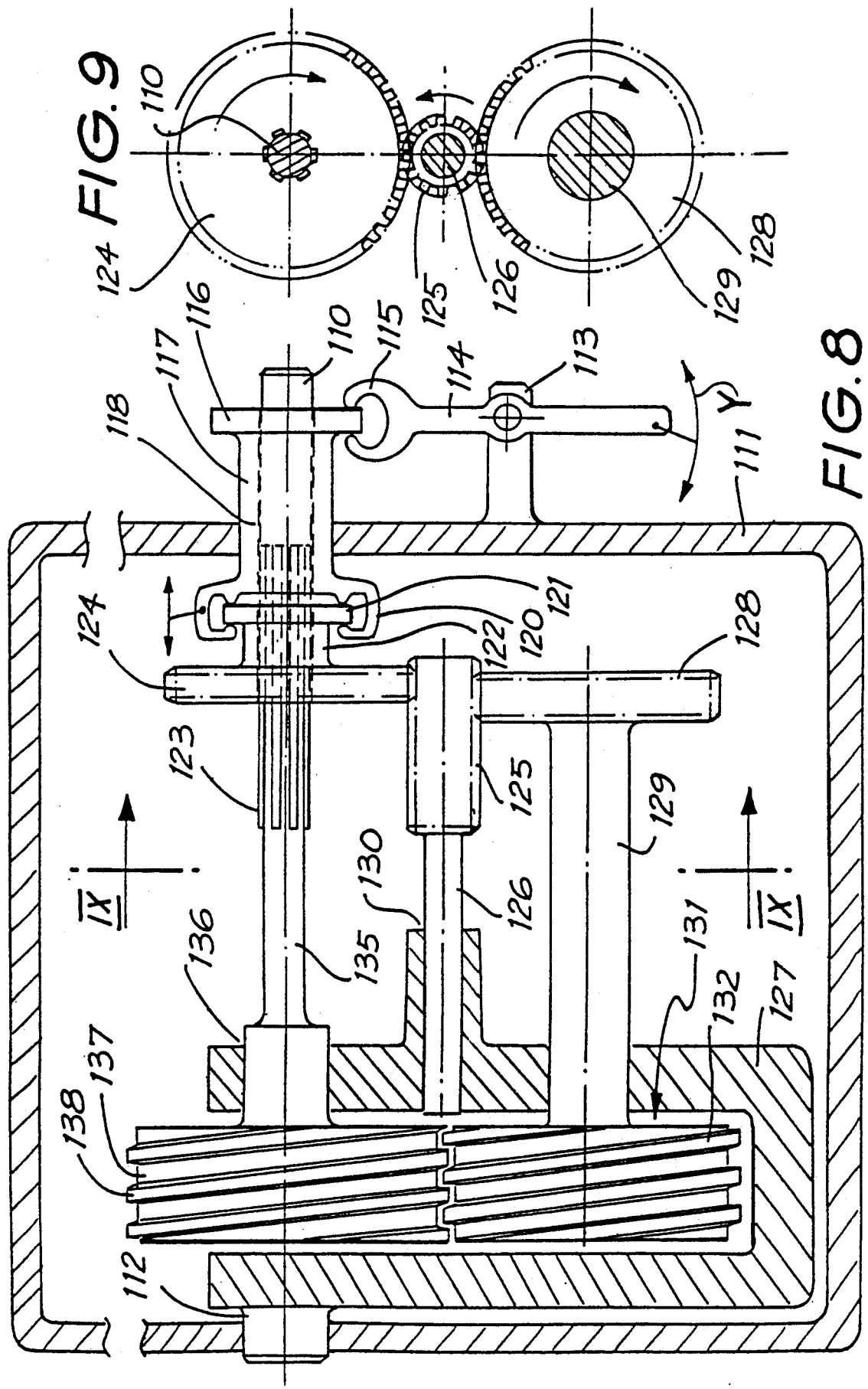

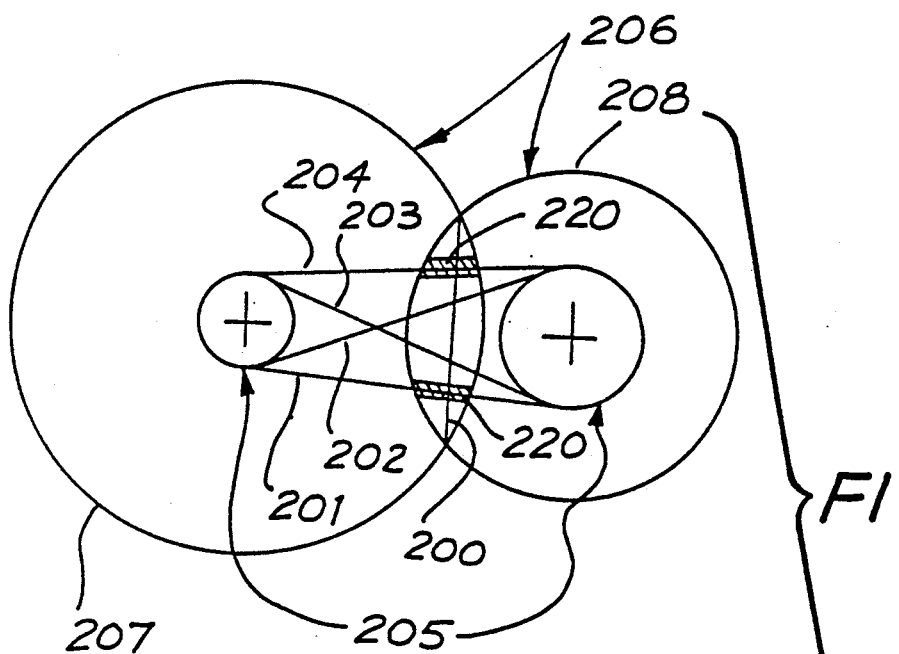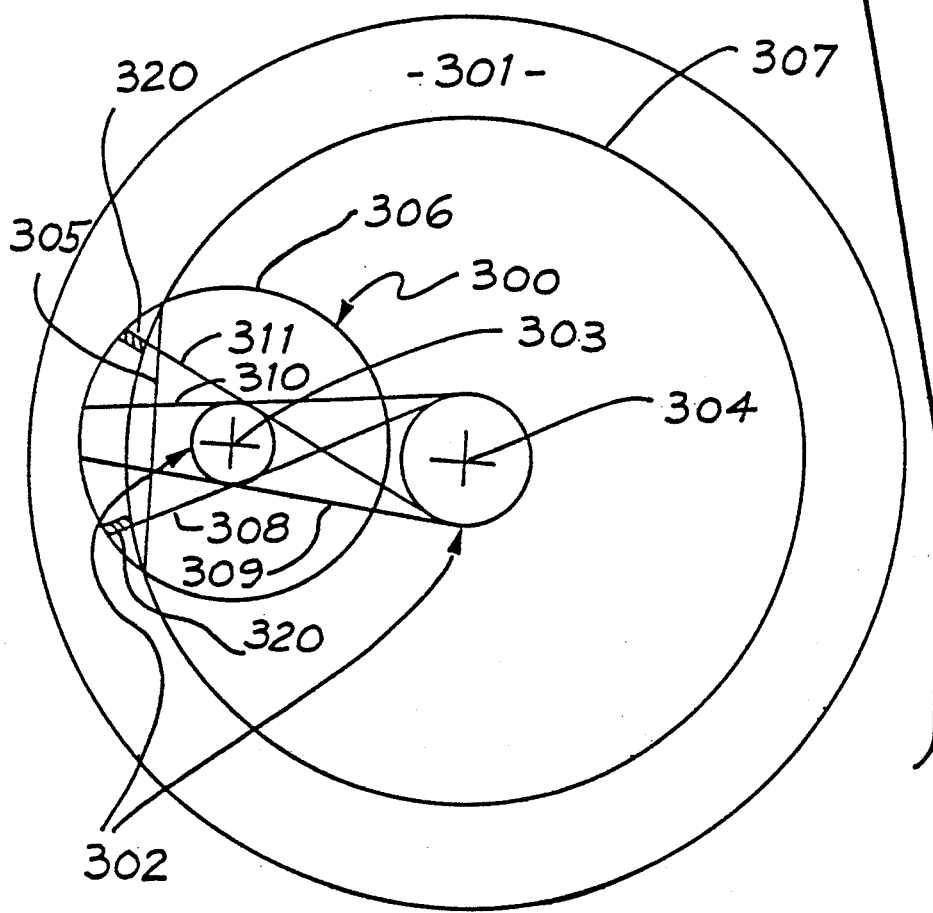
FIG. 12

GEAR MECHANISM

FIELD OF INVENTION

This invention relates to a mechanism for controlling a rotational drive and is more specifically concerned with one which includes two rotary members equipped with teeth which pass through a common meshing zone with rotation of the members.

STATE OF THE ART

Control mechanisms using meshing teeth are able to transmit large loads with very little backlash and with a high degree of precision.

U.S. Pat. No. 3,666,063 of Schoeman et al discloses a control mechanism constructed as a torque converter and converting a multi-directional input into a unidirectional output. This is achieved by two unidirectional clutches one of which is reversed with respect to the other, and a reversing means for enabling an input rotation in either direction to be converted into a unidirectional output. The clutches are of conventional design using friction clutch plates.

U.S. Pat. No. 4,671,129 teaches the construction of a geared shiftable transmission having input and output shafts coupled through a gear network. The transmission is designed to be free of backlash by being preloaded with a spring which maintains engaged surfaces of the gear teeth in contact with one another.

U.S. Pat. No. 3,405,580 is concerned with a rotary drive for a shear and, like the patent mentioned immediately above, avoids backlash. This is achieved by the use of a special backlash take-up gear.

It appears from these and other prior art which has come to the attention of the applicant that backlash, that is to say a clearance between two sets of meshing teeth, is regarded as a major problem as it introduces irregularities in the transmission of drive between two toothed members, and steps should always be taken to avoid backlash if transmission irregularities cannot be tolerated.

OBJECT OF THE INVENTION

An object of the invention is the provision of an improved mechanism for controlling a rotational drive.

SUMMARY OF THE INVENTION

In accordance with one aspect of the invention a mechanism for controlling a rotary drive, has different modes of operation and includes two rotary members equipped with teeth which pass through a common meshing zone with rotation of the members, the teeth being shaped and positioned on the members to remain in mesh while being incapable of transmitting drive in at least one direction between the two members; in which mechanism both members are connected to be driven in synchronism, and means are provided to change the mode of operation of the mechanism by altering the drive to one of the members with respect to the other member. In carrying out the invention the teeth of the members may be tightly or loosely meshed in the meshing zone. As the teeth of one of the members are designed to be incapable of driving the teeth of the other member in at least one direction of drive between them, and the teeth of the two members intermesh, the only condition at which the members will rotate freely is when they are driven at synchronous speed. A change in the applied rotational drive to said other member alone represents a departure from the synchronous condition. As the teeth of said one member are designed to be incapable of transmitting rotational drive to said other member, when the synchronism is lost, further rotation of said one member is prevented by the inability of said other member to be rotated by it.

If one regards the synchronously running condition of the two members as representing a first mode of operation, the jammed or "locked solid" condition when one of the members prevents rotation of the other member can be regarded as representing a second mode of operation. It is possible to have between these two modes of operation, an intermediate or third mode of operation. In this third mode of operation, the teeth of the members rub on one another while they are driven. Heat is generated at the rubbing surfaces. The amount of heat generated can be varied by altering the rubbing pressure and appropriately designing the teeth. This third mode of operation represents a controlled braking mode. In the third mode of operation an input rotary drive applied to both members is not prevented from rotating them but encounters a controlled but selectively variable resistance producing a braking effect. It follows that the mechanism can be arranged to operate in any two of the above modes or in all three, if desired.

In a theoretically possible, but not preferred arrangement for carrying out the invention, the spacing between the axes of rotation of the members is changed, and their teeth are shaped so that the distances between their flank surfaces alters, without the teeth ceasing to mesh in the meshing zone, despite an increase in the spacing between the axes of the members.

In this specification the terms "mesh" and "meshing" are to be understood as meaning only that the teeth of the members overlap or interdigitate with one another in the meshing zone and is not to be restricted in meaning, to the situation in which the teeth actually touch one another in the meshing zone. If the member receiving the drive is the one which is incapable of transmitting the drive through the meshing zone to the other member because of the shape and positioning of the teeth, the mechanism "locks solid" and further rotation of the two members is prevented until they are again driven in synchronism.

PREFERRED FEATURES OF THE INVENTION

In one form of the invention of the two members provide a worm-and-wheel assembly and they rotate about respective axes which lie in transverse, usually perpendicular planes. The worm-and-wheel assembly is incapable, in one configuration, of transmitting drive from the wheel member to the worm member. It will, however, transmit drive with negligible resistance from the worm member to the wheel member.

In the preferred form of the invention the members are constructed as axially parallel cylinders suitably of the same diameter. One member may have a worm tooth spiralling around its axis of rotation and the other may have a groove defined between two opposed tooth-flank surfaces between which the worm tooth is accommodated when passing through the common meshing zone. The advantage of this preferred form of the invention is that the two members, if of the same pitch, rotate at the same speed. With a worm-and-wheel assembly the worm usually rotates much faster than the wheel and this can be a disadvantage with gearing. A further advantage of the preferred form of the invention is that the two cylindrical members can have their teeth shaped so that drive cannot be transmitted through the meshing zone between them, irrespective of the direction of rotation of the drive.

In accordance with a second aspect of the invention there is provided a gear mechanism which includes two gear assemblies having the same gear ratio and each having an input side and an output side, one side of each assembly being connected to be turned by a rotational drive applied to the mechanism from an external source, and the remaining two sides being interconnected so that they rotate together; the first gear assembly having unidirectional drive characteristics (as below defined), and means being provided which are selectively operable to introduce a lost motion between the two assemblies whereby in one mode of operation of the mechanism both gear assemblies are driven by the external source and rotate together, and in a second mode of operation of the mechanism the lost motion prevents one gear assembly from operating so that the mechanism locks solid and the externally applied drive is obstructed.

Preferably the lost motion results from backlash in the second assembly. However lost motion may also be obtained in other ways, for example, by providing for a phase displacement between the two assemblies.

The principle underlying the invention enables a new family of control mechanisms to be devised having advantages over conventional control mechanisms. The invention is applicable to brakes, clutches, torque limiters, drive transmission systems operating variably or stepwise, and to mechanical switches. The feature which distinguishes the mechanism of the invention when used in a clutch, from prior art clutches, is that at all times the two members remain in mesh with one another. The advantages of the mechanism vary from one arrangement of use to another, but it is capable in different applications of providing one or more of the following advantages: better compactness; better reliability; better ability to hold a load stationary when there is a failure of the input drive; reduced cost; fewer working parts; and, better cooling ability.

The mechanism may also be arranged to drive or brake a particular torque. This torque may be predetermined by setting suitable control. This should be contrasted with the techniques of setting a frictional value, as is customary with conventional mechanisms designed to drive or brake a particular torque.

Conveniently the means takes the form of a device positioned in a mechanical drive connection, such as a drive shaft, extending to one of the members. The mechanical drive connection may alternatively be of a flexible form such as would be provided by a belt drive or a chain running over sprockets. The means may then operate by varying the relative tension of forward and return runs of the flexible drive connection. In a further arrangement, one of the members may be driven by a resilient drive shaft which yields in response to a torsionally applied stress between its ends, to overcome the gearlash between the synchronising drives.

In accordance with a third aspect of the invention a gear mechanism is provided with two gear assemblies having the same gear ratio and each having an input side and an output side, one side of each assembly being connected to be turned by rotational drive applied to the mechanism from an external source, and the remaining two sides of the assemblies being interconnected so that they rotate in unison; the first gear assembly having unidirectional drive characteristics (as below defined); the second gear assembly having at least some backlash; and, means being provided for overcoming the backlash when the mode of operation of the mechanism is to be changed.

The expression "unidirectional" drive as applied to an assembly of toothed members such as gears, is to be understood in the context of this specification as meaning that if rotational drive is applied to one side of the assembly having the uni-directional drive characteristic when no synchronising drive is applied to the assembly's other side, the assembly will 'lock solid' and will not transmit drive between its sides. If however synchronising drive is applied to both sides of the assembly, the assembly members can rotate. Several forms of gear assemblies displaying a uni-directional drive are well known. Amongst these the most common is probably the worm-and-wheel assembly.

In carrying out the second and third aspects of the invention, the speed ratios of the two assemblies are preferably of the order of 1:1. One way of achieving this is to use a first toothed assembly having two cylindrical meshing members which have meshing helical teeth, the pitches of the helices of the two sets of teeth being slightly different. The axes of rotation of the two members may be slightly offset so that they are not exactly parallel to one another. In an alternative to this arrangement, the axes of the two members are actually parallel and the teeth are identical. The pitch of their helices is the same.

When cylindrical members are used it is not essential that they rotate in the same direction. All that is important is that their teeth propogate at the same speed through the meshing zone and in the same direction when the mechanism is not to offer resistance to the externally-applied drive. This result may be achieved by driving the members in opposite directions and having the members provided with teeth which are arranged respectively clockwise and anti-clockwise on the circumferences of the members. Alternatively the members may be designed to be driven in the same direction.

In the preferred arrangement of the third aspect of the invention the first assembly comprises a simple worm-and-wheel and the second gear assembly comprises a pair of meshing gear wheels of the same drive ratio as the worm and wheel assembly. However the second gear assembly may also comprise a worm-and-wheel but it must then have bi-directional drive characteristics, i.e. be capable of transmitting drive through it in either direction of rotation. One or each of the assemblies may comprise more than two meshing gears if required.

The means used in carrying out the invention may be designed to enable the mechanism to have two or more of up to four different operational modes. At two of the modes the means allow rotation of the mechanism respectively in one of two directions of rotation while preventing rotation in the reverse direction. The mechanism then drives in one or other direction only. In the third operational state of the phase displacement means it allows both members to be driven at a synchronous speed so that their teeth do not lock against one another. The mechanism may then be driven in either direction without offering any resistance to the input rotary drive. In the fourth operational state of the phase displacement means it may change the phase angle between the synchronising drives to the members sufficiently to overcome backlash or freeplay (which may be resiliently introduced), only after a preset torque is attained. The mechanism then behaves as a torque limiter and, although the members rotate in synchronism, their teeth slide against one another to some extent in the meshing zone to generate heat which is suitably dissipated, for example, by immersing the members in a coolant liquid.

INTRODUCTION TO THE DRAWINGS

The invention will now be described in more detail, by way of examples, with reference to the accompanying largely diagrammatic and schematic drawings, in which:

IN THE DRAWINGS

FIG. 2A shows an end view of FIG. 2 as seen when viewed in the direction of the arrow "A" in FIG. 2.;

Figure 2:
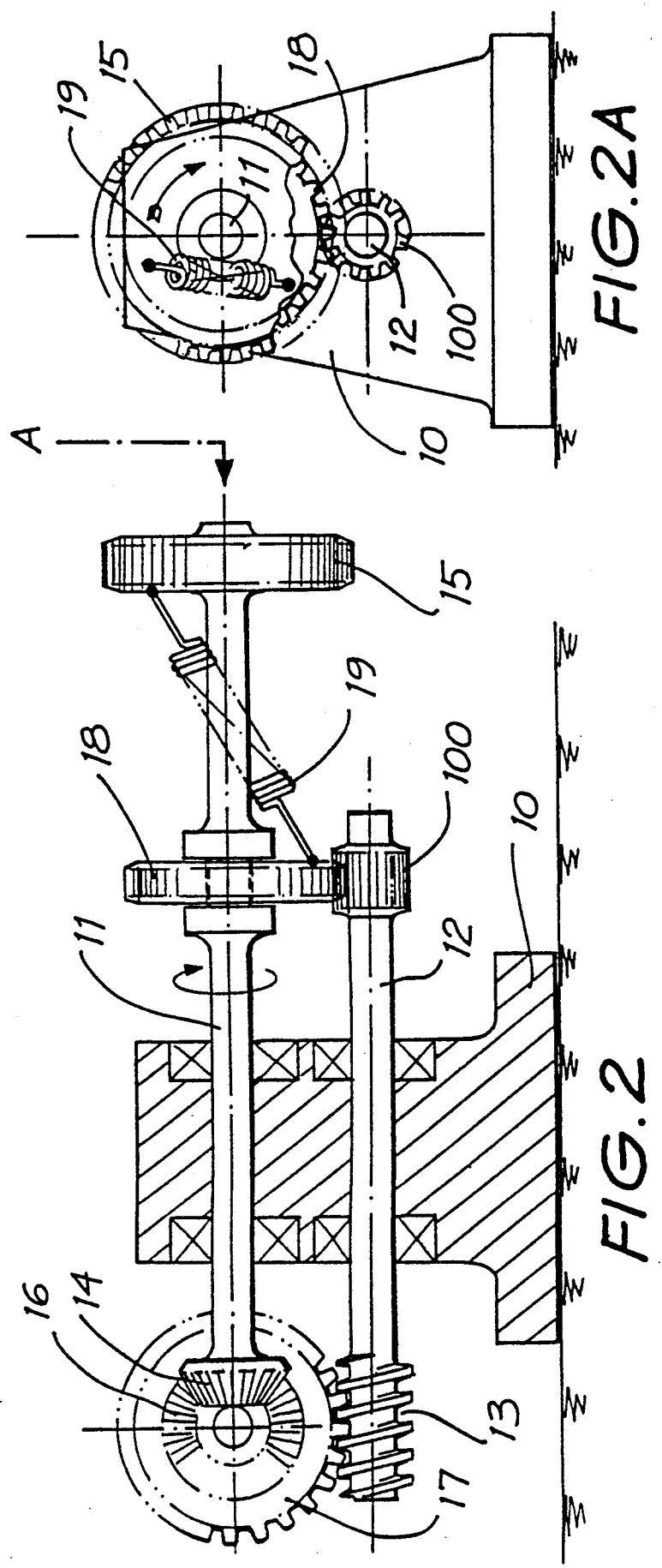
FIG. 2 shows a mechanism capable of being switched selectively between three modes of operation at one of which it exhibits bi-directional characteristics, and at the other two of which it respectively exhibits one way characteristics but in opposite directions of rotation.
Figure 7:
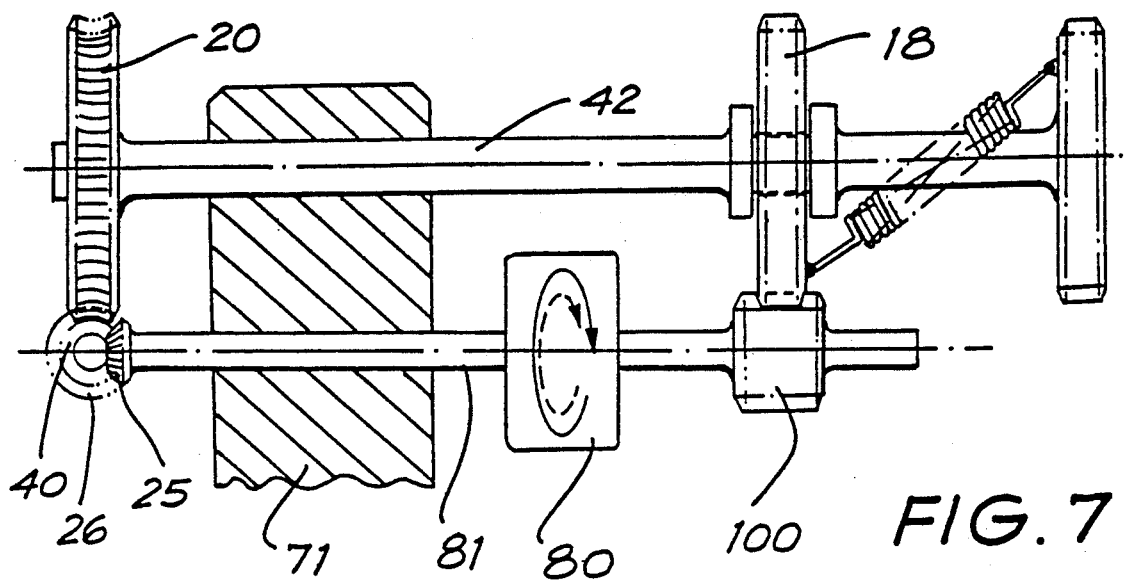
Figure 11:
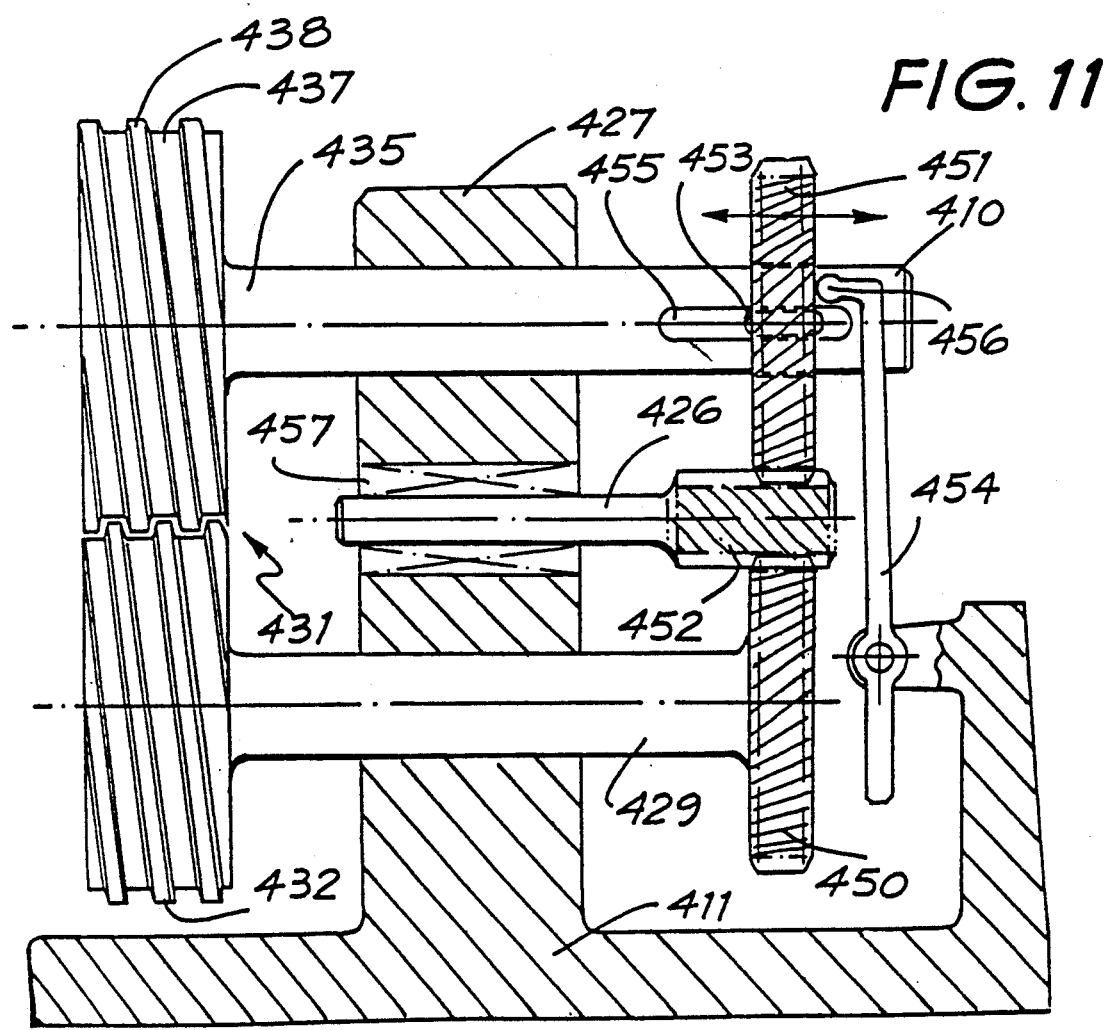
Figure 10:
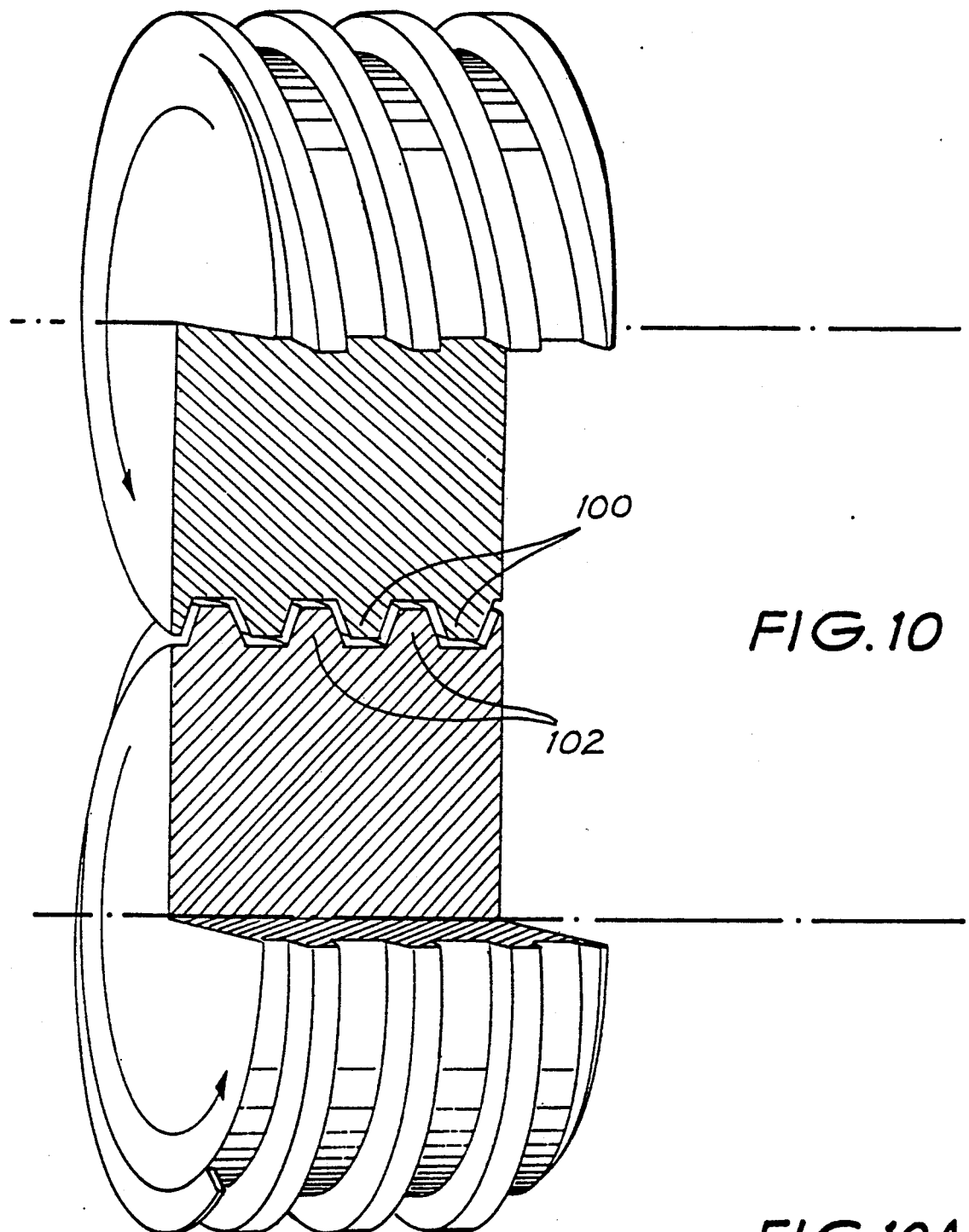
Figure 10A:
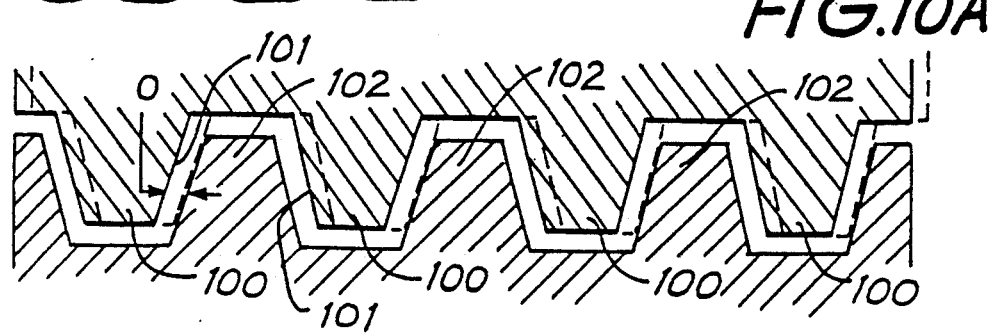
Figure 13:
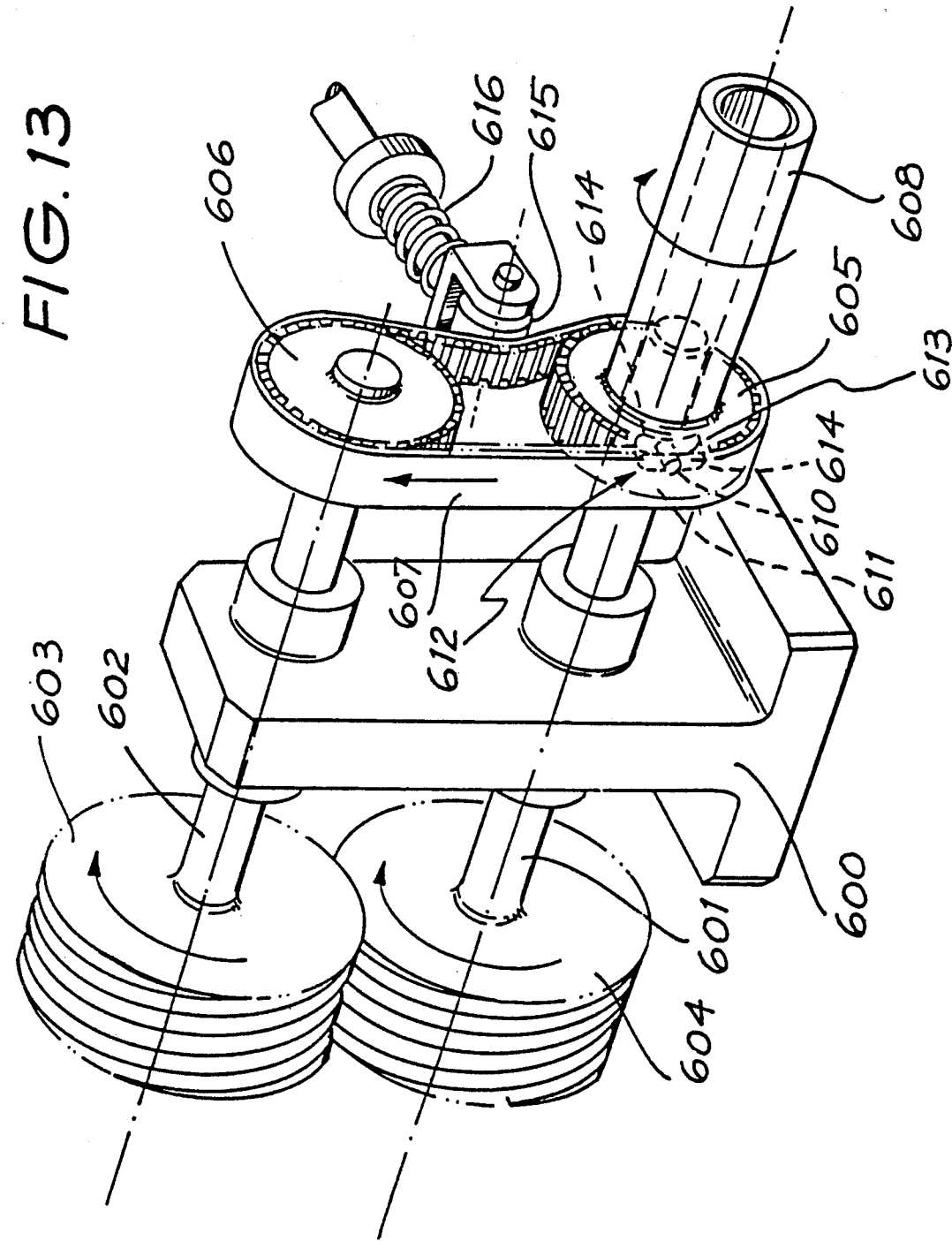

FIG. 7 corresponds to FIG. 2 but shows a phase displacement device used to change the operating mode of the mechanism by changing the angular displacement of one end of a shaft connection extending to one of the members, with respect to its other end which is effectively connected to the other member through a gear assembly;

FIG. 8 shows a clutch mechanism using two similar axially parallel members having circumferentially extending meshing teeth which spiral in the same direction around the members;

FIG. 9 is a section through FIG. 8 taken on the line and in the direction of the arrows IX—IX in that figure;

FIG. 10 shows in perspective view, two cylindrical meshing locking members cut away to show the section between them along which FIG. 10A is taken;

FIG. 10A is a developed diagram of the meshing section of the meshing teeth of FIG. 10 and is used to explain a principle underlying the invention;

FIG. 11 shows a mechanism similar to that described with reference to FIG. 8 but having an alternative phase displacement means;

FIG. 12 shows in two sketches, gear parameters referred to in the accompanying description and which must be observed in order for the gear teeth to engage with a line, rather than a point contact; and FIG. 13 is a perspective view of a mechanism having a belt or chain connection between two gear members and resilient means for controlling the tension in the belt or chain to alter the mode of operation of the mechanism.

Figure 14:
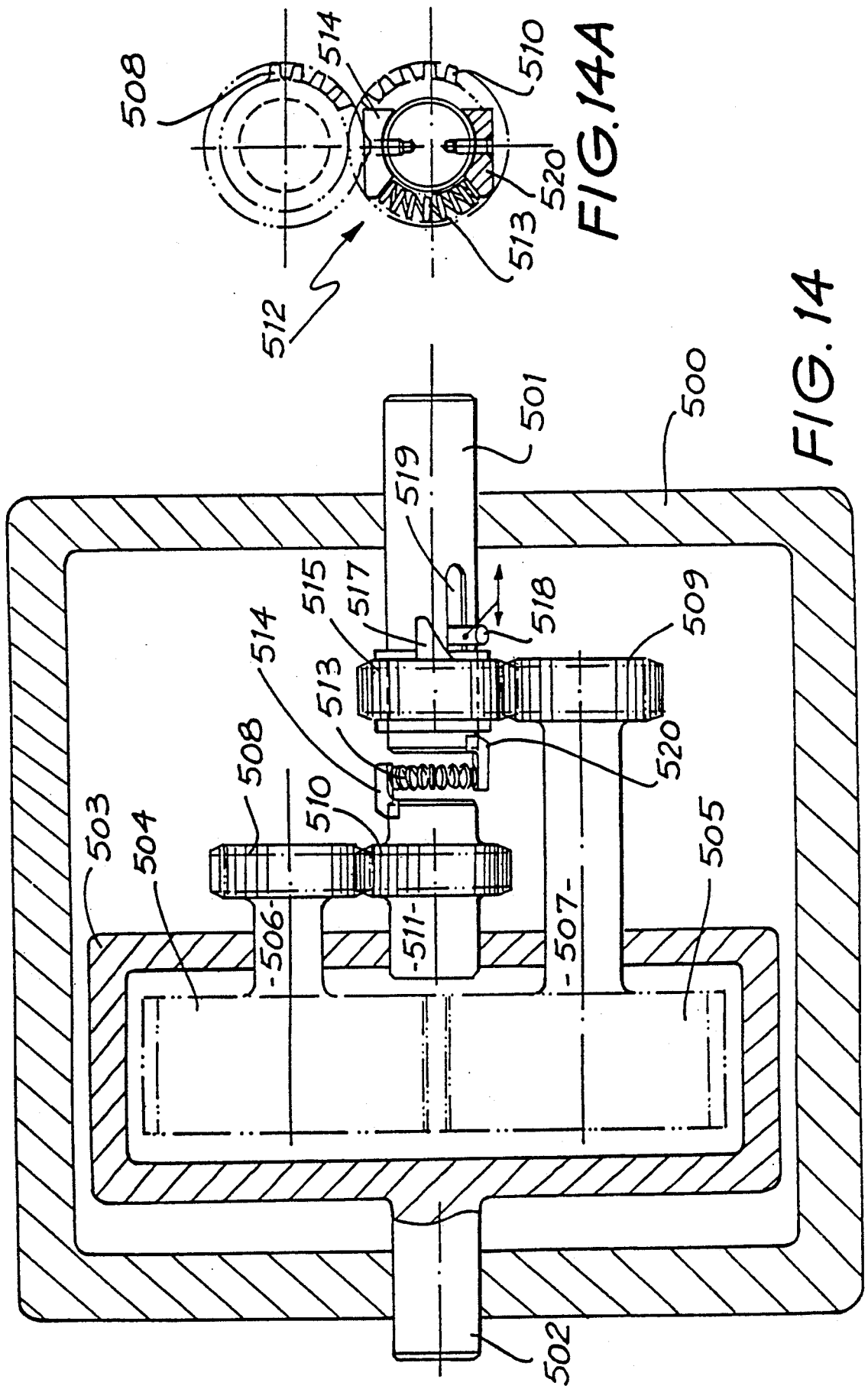
Figure 15:
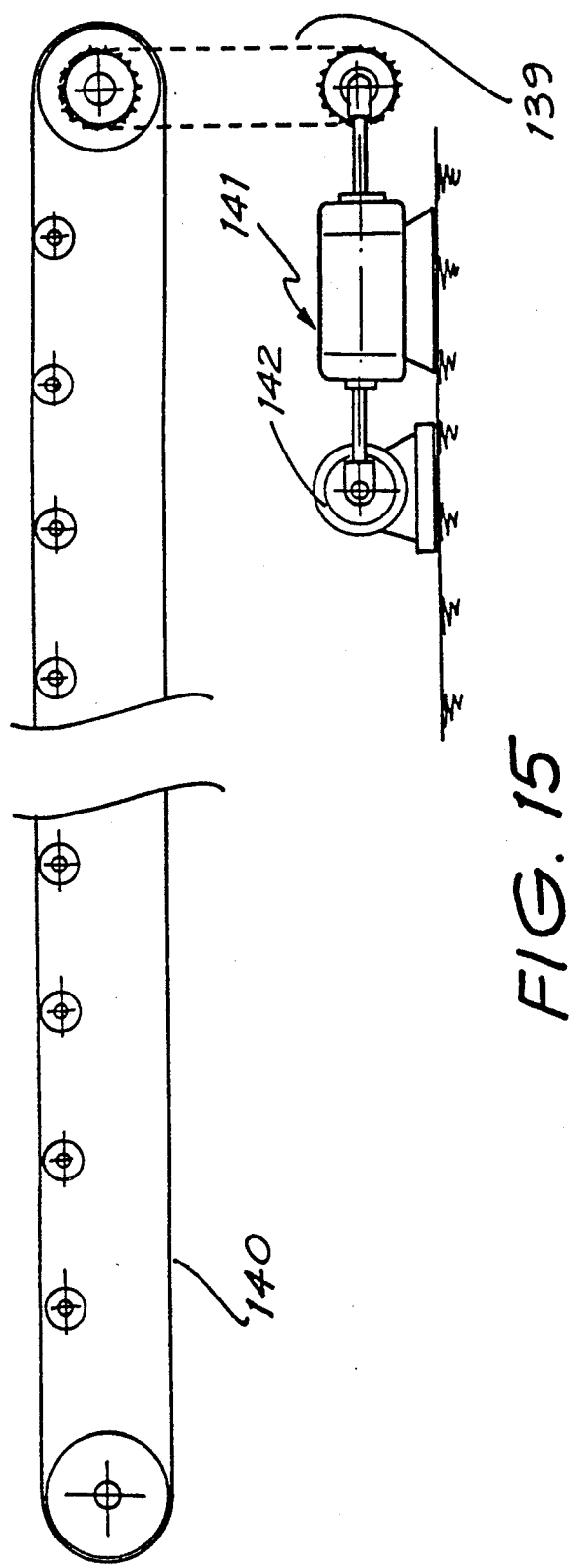

FIG. 14 shows a mechanism using a lost motion device to change the mode of its operation; and FIG. 14A shows an end view of the torsional device used in FIG. 14;

FIG. 15 shows a mechanism of the invention incorporated into a conveyor belt drive control system.

PRINCIPLE UNDERLYING THE INVENTION

The principle underlying the invention will now be explained with reference to FIG. 10. This shows a first set of teeth two of which are shown at 100, mounted on a rotary member and meshing with a second set of teeth, parts of which are shown at 102.

The teeth 100 and 102, in the positions shown in full outline, do not actually touch one another although they are in mesh. The term "mesh" is used in this specification as meaning that the teeth lie in an overlapping relationship in their meshing zone. They may, or may not actually touch. If the members carrying the teeth are rotated at a synchronous speed, the teeth 100 and 102 will retain the relative positions shown at which they never touch as the members rotate. This applies irrespective of the synchronous speed at which the members are driven, or their direction of rotation provided the teeth always travel in the same direction through the zone of overlap between the members. It follows that it is not essential for the members to rotate in the same direction. They can rotate respectively in opposite directions provided one of the teeth winds oppositely-handedly to the other on the other member.

Now assume a controlled change of phase (represented by the distance '0' in FIG. 10A of the teeth 100 with respect to the teeth 102 is produced, causing the the teeth 100 to move to the positions shown in broken outline and at which their flank surfaces rub at positions 101 on the flank surfaces of the teeth 102. Frictional heat is then generated in the rubbing zones of the teeth and represents a dissipation of some of the energy of the input drive to the mechanism. The amount of heat generated is a function of the pressure between the rubbing flank surfaces of the teeth and this, in turn, is a function of the force with which the teeth 100 engage the teeth 102. The frictional heat will continue to be generated in the mechanism as long as the two members are rotated in synchronism and the teeth 100 rub against the teeth 102. This condition occurs as a result of the distance 0 between the teeth 100 and 102 reducing to zero.

Let it be assumed that the input torque urges the teeth 100 against the teeth 102. If this force progressively increases in magnitude then the frictional heat generated by the teeth 100 rubbing on the teeth 102 will increase. In practice, heat may be dissipated by immersing the members in a bath of cooling oil.

The dissipation of the frictional heat generated can be important. When the teeth engage with a point contact, excessive wear can result. This wear can be greatly reduced by arranging for the teeth to rub against one another with line contact, instead of point contact. To achieve this result, reference is made to the two sketches of FIG. 12. FIG. 12 shows, in the upper sketch, parameters which must have a certain relationship when two external meshing helical members are to engage one another with line contact. The lower sketch of FIG. 12 shows the parameters which must have a certain relationship if an external helical member is to mesh with an internal helical member with a line contact. The line contact is referenced 220 in the upper sketch, and 320 in the lower sketch.

Turning first to the upper sketch of FIG. 12, two external helical members 207, 208 of the same helix direction and lead, or of different lead, can have theoretical line contact if of single or multi-start form with identical pitch and if their teeth flanks are composed of involute helicoids with generating base diameters 205 proportional to their respective lead, and the axes of the members are parallel and spaced so that a line 200 joining the intersections of the wheel member outside diameters 206 passes across four lines referenced 201, 202, 203, 204 which are tangent to both generating base diameters 205.

In the case of the lower sketch of FIG. 12, an internal helical wheel member 301 meshing with an external helical wheel member 300 of opposite helix direction and of the same lead, or of different lead, can have theoretical line contact if of single or multi-start form with identical pitch and if their flanks are composed of involute helicoids with generating base diameters 302 proportional to their respective lead and the wheel axes 303, 304 are parallel and spaced so that a line 305 joining the intersections of the outside diameter 306 of the external wheel member 300 with the inside diameter 307 of the internal wheel member 301 passes across four lines 308, 309, 310, 311 which are tangent to both generating base diameters 302.

For a more detailed discussion of gear design, reference should be made to the text book "Analytical Mechanics of Gears" by E. Buckingham.

Returning to FIG. 10, the teeth 100 and 102 are so shaped and positioned by their design that, while they can mesh with one another, one member cannot drive the other member by way of the teeth. This, of course, occurs in one direction at least, with a worm-and wheel gear assembly. However, some gear wheels can be designed with this, apparently useless, characteristic, if it is so desired so that although the teeth mesh with one another, they are incapable of transmitting drive in either direction through their common meshing zone. As long as the two gear members continued to be driven in synchronism, their teeth continue to propogate through the meshing zone in the same direction and at the same speed. However, if drive is removed from one of the members so that it stops rotating, it cannot, because of the design of the teeth, be driven by the other member. As the teeth of the two members continue to mesh in the meshing zone, the member to which drive is still applied, is prevented from further rotation by the other member whose rotation has stopped. The mechanism then "locks solid", i.e. it jams.

One method of removing drive from one of two members driven in synchronism from a common source of rotary drive is to introduce gearlash in the synchronising drive. The drive then forces the teeth of one member against the teeth of the other member before the latter member has had the drive applied to it. The latter member then prevents said one member rotating until such times as the gearlash has again been reduced sufficiently to allow both members to be driven in synchronism.

From the above description it will be seen that controlling the gearlash phase angle between the synchronising drives is one way of changing the mechanism's mode of operation from a first mode, at which the mechanism offers no resistance to an applied drive, to a second mode, at which a controllable degree of braking is applied. The controllable degree of braking is determined by the amount of resilience which has to be overcome to take up gearlash. The third mode occurs when the applied drive is incapable of rotating as the gear members have locked solid. If the teeth are designed to gives the two members unidirectional drive characteristics, the mechanism can be designed to "lock solid" in only one direction of rotation of the input drive. The invention can be carried out by using members which operate this way, or which lock solid in both directions of rotation of the input drive.

DESCRIPTION OF FIRST EMBODIMENT

Figure 1:
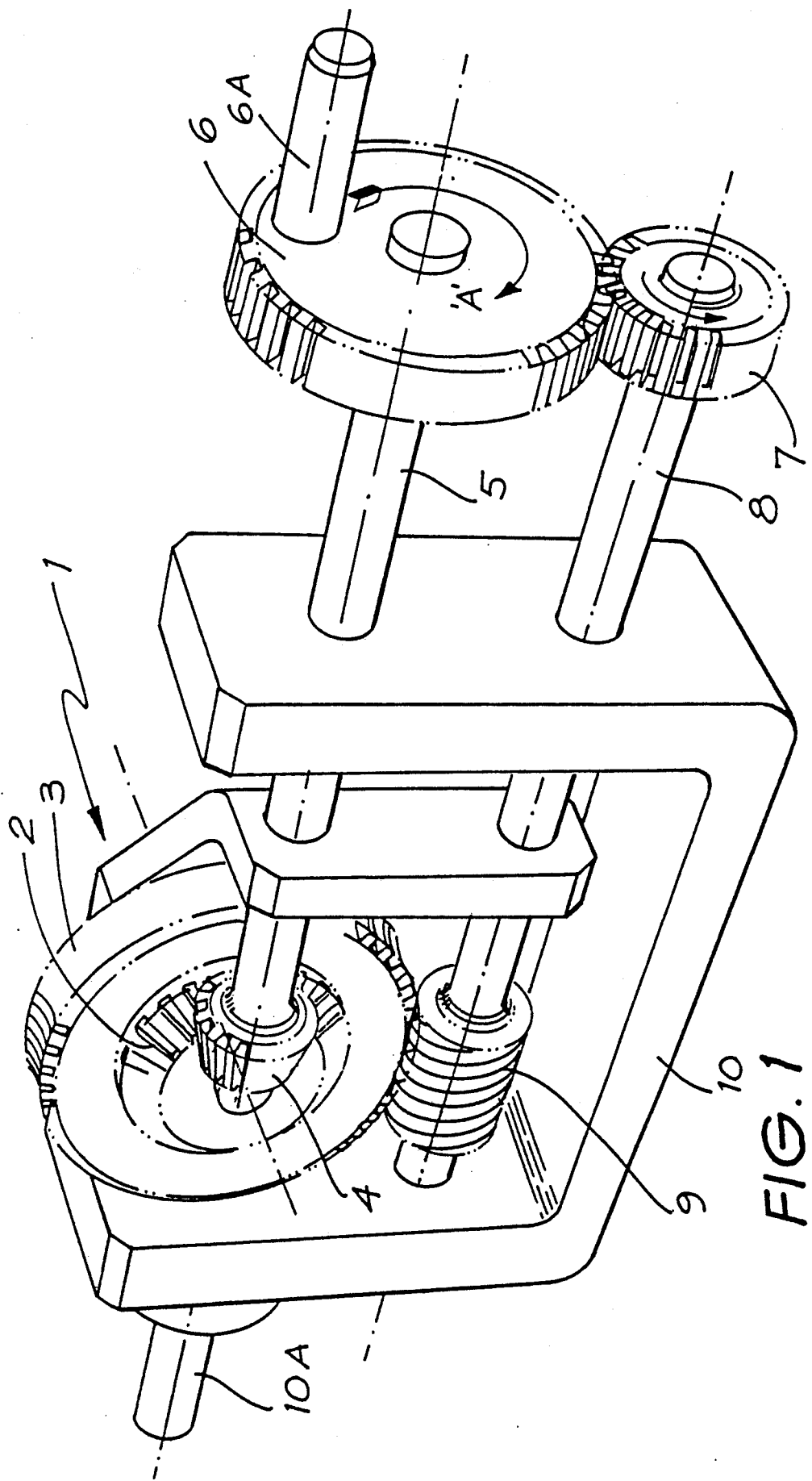
FIG. 1 shows a mechanism which behaves as a sprag clutch or an infinite ratchet, and is a perspective view.

FIG. 1 shows a gear member formed by a wheel 1 having an annular toothed inner face 2 and a toothed outer rim 3. A bevel gear 4 runs on the gear face 2 and drives a shaft 5 carrying a gear 6 providing a phase displacement means. A spur gear 7 has its teeth meshing with those of the gear 6 and turns a shaft 8 having at its end a second member formed by a worm gear 9 meshing with the toothed rim 3 of the wheel 1. A predetermined level of backlash is designed into the engagement of the teeth of the gear 6 with the teeth of the gear 7. The gears 3, 9 and 2, 4 form a first assembly having a predetermined speed ratio, and the gears 6, 7 form a second gear assembly having the same speed ratio as the first gear assembly but having a bi-directional drive characteristic. The first gear assembly has a uni-directrional drive characteristic and will not transmit drive from the wheel to the worm.

The above mechanism behaves as an infinite ratchet or sprag clutch and may be used to tighten a nut (not shown) to which an axial extension 10A of a frame 10, arranged coaxially with the shaft 5, is fitted. The shafts 5 and 8 are mounted for rotation in the frame 10 and an eccentric handle 6A of the ratchet is connected to gear 6.

OPERATION OF FIRST EMBODIMENT

The mechanism operates as follows:

It is assumed that the permitted direction of rotation of the gear 6 is in the direction of the arrow 'A'. The teeth of the gear 6 engage, in turn, one set of flanks of the teeth of the gear 7. If the handle 6A is moved in a direction of the arrow A, the rotational drive is transmitted through the gear 7 and the shaft 8 to the worm 9 to turn it so that it moves the toothed rim 3 in synchronism with the turning movement of the handle of the ratchet. If now the ratchet handle 6A is turned in the opposite direction, the teeth of the gear 6 also turn in the opposite direction. Before they can transmit their drive to the teeth of the gear 7 they have to move through an angle determined by their backlash with the teeth of the gear 7. While attempting to move through this backlash angle, obviously no rotational drive is transmitted via the shaft 8 to the worm 9. Worm 9 therefore fails to rotate and holds the gear 2 against rotation in consequence. The leverage applied to the handle 6A of the ratchet is now applied by way of the frame 10 to turn the extension 10A and thus the nut accommodated in an end socket (not shown) in its end.

DESCRIPTION OF SECOND EMBODIMENT

In this embodiment parts corresponding to like parts of FIG. 1 are similarly referenced for ease of understanding.

FIG. 2 shows a frame 10 supporting two rotatable shafts 11 and 12. Shaft 12 supports at one end a member formed by a worm gear 13, and at the other end a spur gear 100. Shaft 11 supports at one end a crown gear 14 and at the other end an input drive gear 15. The crown gear 14 runs on a face gear 16 formed on one side of a member formed as a wheel gear 17 having the worm 13 meshing with its toothed edge.

The spur gear 100 meshes with a follower gear 18 providing phase displacement means and which is freely rotatable on the shaft 11. A bias spring 19 extends between the gear 18 and the gear 15 and is arranged in a chordal plane with respect to them both as is clearly illustrated in FIG. 2A.

The gears 13, 14 and 16, 17 form a first gear assembly having a predetermined gear ratio, and the gears 100 and 18 form a second gear assembly having the same gear ratio as the first gear assembly but having a bi-directional drive characteristic. The first gear assembly has a unidirectional drive characteristic and will not transmit drive from the wheel to the worm.

OPERATION OF SECOND EMBODIMENT

The mechanism of FIGS. 2 and 2A operates as follows:

An external drive (not shown) is applied to the gear 15 to turn it in the direction of the arrows shown, and rotates the shaft 11 and thus the gear 17. The drive is also applied through the spring 19 to the gear 18 causing it to turn in synchronism with the gear 17 and to rotate the spur gear 100. As the two gear assemblies have the same gear ratio, the helical tooth of the worm gear 13 propagates axially in synchronism with the circumferential movement of the teeth of the gear 17 and in the same direction through the meshing zone between them. The first gear assembly therefore offers no resistance to the drive applied to the input of the mechanism.

If the drive input is now reversed in direction, the spring 19 allows the shaft 11 to turn through an angle with respect to the position of the gear 18. During this period no drive is imparted to the spur gear 100 and the worm gear 13 no longer rotates. This stops rotation of the gear 17 before the spring 19 has tensioned sufficiently to transmit the motion of the gear 15 to the gear 18. As gear 17 cannot now rotate, the drive applied to input gear 15 is blocked and the mechanism 'locks solid', or jams.

If the gear 18 is now turned in a direction which reduces the "backlash" provided by the spring 19, it will eventually cause the teeth of the gear 18 to contact those of the gear 100 and allow drive to be transmitted to the worm 13 via the shaft 12 and the spur gear 100. The worm will now turn and free the first gear assembly for rotation with the input drive, as the two sides of the worm-and-wheel are once again driven in synchronism.

In an unillustrated modification of the above described arrangement the gears 15 and 18 are connected by two springs which are attached at one pair of ends to one end of a toggle arm pivoted eccentrically to the gear 18 so that its free end provides an operating arm extending beyond the rim of the gear 18. The toggle arm has three stable positions. At one of the stable positions one of the springs is relaxed and the other spring is tensioned to allow the mechanism to turn in one direction only. At the other extreme position of the toggle arm, the states of the springs are reversed so that the mechanism is free to turn only in the other direction. At the third, or intermediate stable position of the toggle arm, both springs are equally tensioned and the gear 18 then follows faithfully the movement of the gear 15 in both directions without backlash. The mechanism then exhibits bi-directional drive characteristics.

DESCRIPTION OF THE THIRD EMBODIMENT

Figure 3:
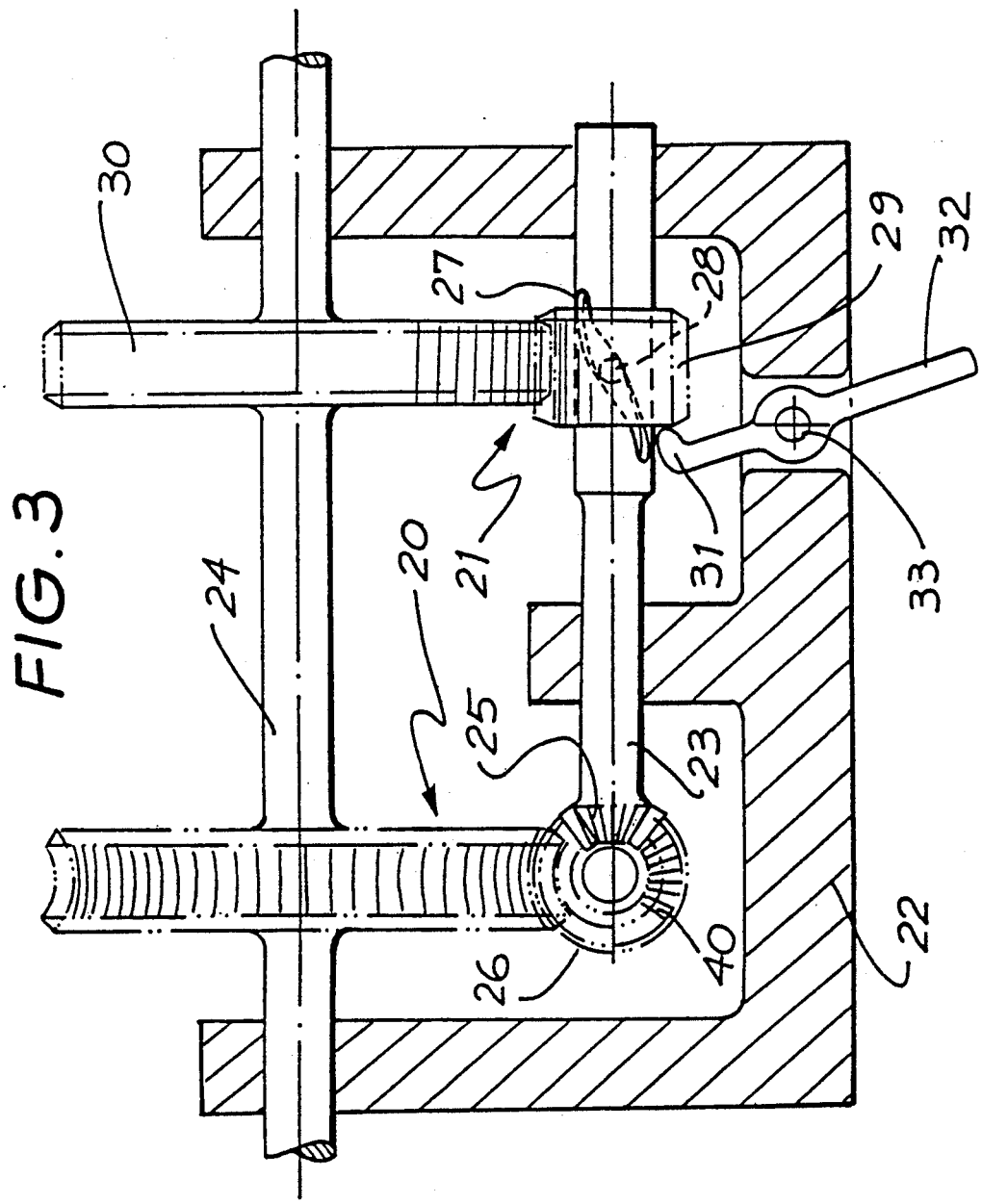
FIG. 3 shows a mechanism having its mode of operation controlled by a lever forming part of mode-changing means and which, in one limiting position, allows the mechanism to turn in one direction only, and which, in the other extreme position allows the mechanism to turn in the reverse direction only.

The mechanism shown in FIG. 3 has a first gear assembly 20 formed by two members providing a worm-and-wheel, and a second gear assembly 21 formed by a pair of rim gears 29, 30 having the same gear ratio as the worm-and-wheel and having built into it a designed amount of backlash. The two assemblies 20, 21 are interconnected by a pair of shafts 23 and 24 as with the mechanism of earlier figures. The shafts 23, 24 pass through a frame 22.

The shaft 23 carries at one end a crown gear 25 meshing with a face gear 40 at one end of a worm gear 26 of the assembly 20. Intermediate its ends, the shaft 23 has a spirally-extending circumferential slot 27 in which rides a sliding key 28 of the gear 29 of the assembly 21. The other gear 30 of the assembly 21 is attached to the shaft 24.

Gear 29 can slide to different positions along the shaft 23. This travel is controlled by a nose 31 at one end of a hand lever 32 pivoted at 33 intermediate its ends to the frame 22 and providing a phase displacement means. A bias spring (not shown) holds the gear 29 against the nose 31 at all times.

OPERATION OF THE THIRD EMBODIMENT

The mechanism of FIG. 3 operates as follows:

If the gear 29 is at one extreme position of movement along the shaft 23, determined by the nose 31, the teeth of the gears 29 and 30 are in driving contact, and input rotational drive from an external drive source applied to the shaft 24 will cause both gear assemblies to rotate freely, the worm gear 26 being driven by the gear 29 of the second assembly. If the direction of rotation of the applied drive is now reversed, the backlash in the second gear assembly interrupts the drive transmission to the worm 26 and the shaft 24 is prevented from moving in the direction of the reversed applied drive.

If now the nose 31 pushes the gear 29 against the bias spring and in a direction which reduces the backlash to zero, drive will once again be transmitted to the worm gear 26 by way of the second gear assembly. The mechanism will then rotate freely and follow the reversed applied drive.

DESCRIPTION OF FOURTH EMBODIMENT

Figure 4:
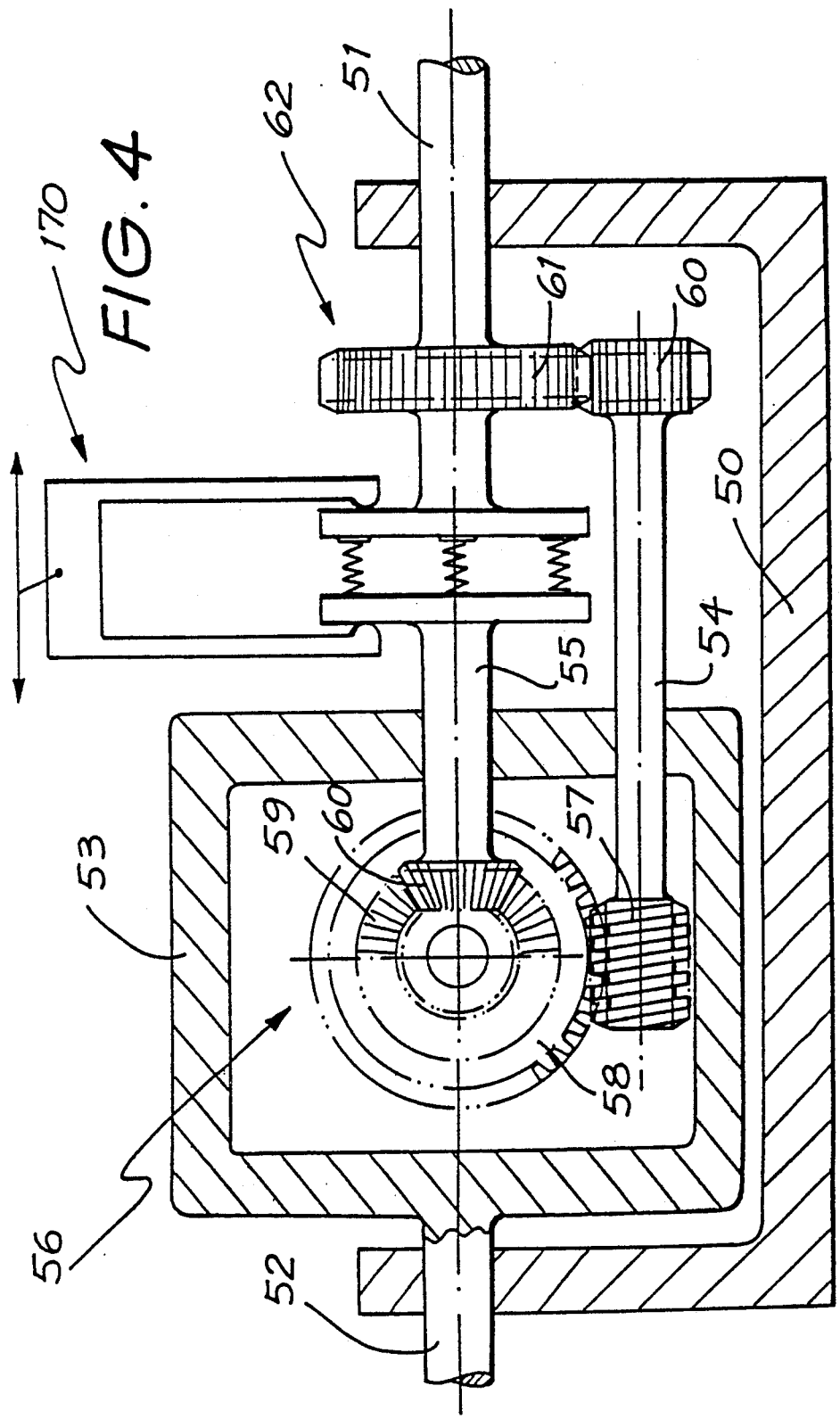
FIG. 4 shows the invention incorporated into a clutch mechanism which allows maximum torque delivery to its output side to be dependent upon a predetermined and adjustable threshhold torque being applied to the mechanism.

FIG. 4 shows the mechanism, used as a clutch which transmits power in an adjustable controlled manner.

The mechanism has a fixed frame 50 supporting two axially-aligned shafts 51 and 52. The shaft 51 provides an input drive shaft and the shaft 52 provides an output drive shaft.

The shaft 52 supports a rotatble casing 53 within the frame 50 and through which two parallel shafts 54 and 55 extend. The casing may be immersed in oil and have oil flowing through it to dissipate internally generated heat.

A first gear assembly 56 having unidirectional drive transmission characteristics is mounted inside the casing 53 and is formed by a worm-and-wheel assembly of which one member, providing the worm gear is referenced 57 and the other member, providing the wheel gear, is referenced 58. The wheel gear 58 has a face gear 59 meshing with a bevel gear 60 attached to one end of the shaft 55. The other end of the shaft is attached to an adjustable torsioning assembly shown diagramatically at 170, operable to alter its resilience to torque applied between shafts 51 and 55. Some gearlash exists between two gears 60 and 61 of a second, but bi-directional gear assembly 62.

The input shaft 51 is connected to the second gear assembly 62 which has the same gear ratio as the first gear assembly 56. The torsioning assembly provides a phase displacement control means.

OPERATION OF FOURTH EMBODIMENT

The mechanism of FIG. 4 operates as follows:

When the two shafts 51 and 52 are to operate independently of one another, the torsioning assembly 170 is adjusted so that virtually no torsional load is transmitted between the shafts 51 and 55. Input drive applied to the shaft 51 therefore divides at the second assembly 62 and part of it is used to turn the wheel gear 58 and part to rotate the worm 57, at a synchronous speed with respect to the gear wheel 58, by way of the second gear assembly 62. No opposition to the input rotational drive is now offered by the mechanism as the worm 57 and gear 58 rotate at synchronous speeds, and the output shaft 52 therefore remains stationary, while gear assemblies 56 and 62 rotate freely.

If now the torsioning assembly 170 is adjusted to introduce a predetermined torsional stiffness between the shafts 51 and 55, shaft 52 and casing 53 will rotate and transmit the predetermined torque.

With the load on the shaft 52 as reaction, the gear 61 will not transmit drive to the gear 60 unless the backlash between them is negated by the change in phase of the shaft 51 with respect to shaft 55. This change in phase is caused by overcoming the resilience or stiffness in the torsioning assembly 170.

Gear assemblies 56 and 62 will rotate if any attempt is made to drive more than this predetermined torque.

In operation of the mechanism, the greater the stiffness introduced in the torsioning assembly, the stiffer the input and output shafts 51 and 52 are locked to one another in the direction of drive.

In practice, the torsioning assembly 170 of FIG. 4 will be mounted in a position at which it does not impede the rotation of the shaft 54 about the shaft 55 when the mechanism is transmitting drive between the two shafts.

In carrying out the invention, both of the gear assemblies may be constructed as worm-and-wheels. It is naturally important that the two assemblies have the same gear ratio. As previously mentioned, this may be substantially 1:1 if their configuration is arranged as shown in FIGS. 5 and 6 which will now be described.

DESCRIPTION OF FIFTH EMBODIMENT

Figure 5:
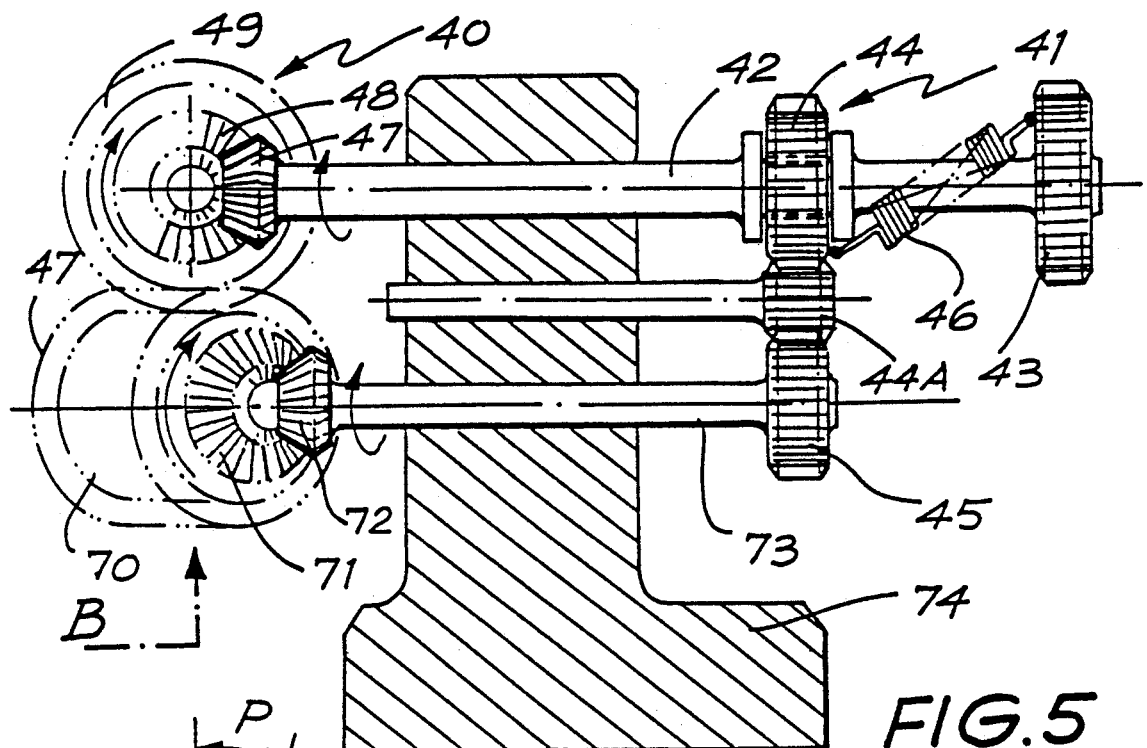
FIG. 5 shows a mechanism in which two cylindrical helical members mesh with one another, the members being shown with their mutual inclinations to one another greatly exaggerated to facilitate understanding of the accompanying description.
Figure 6:
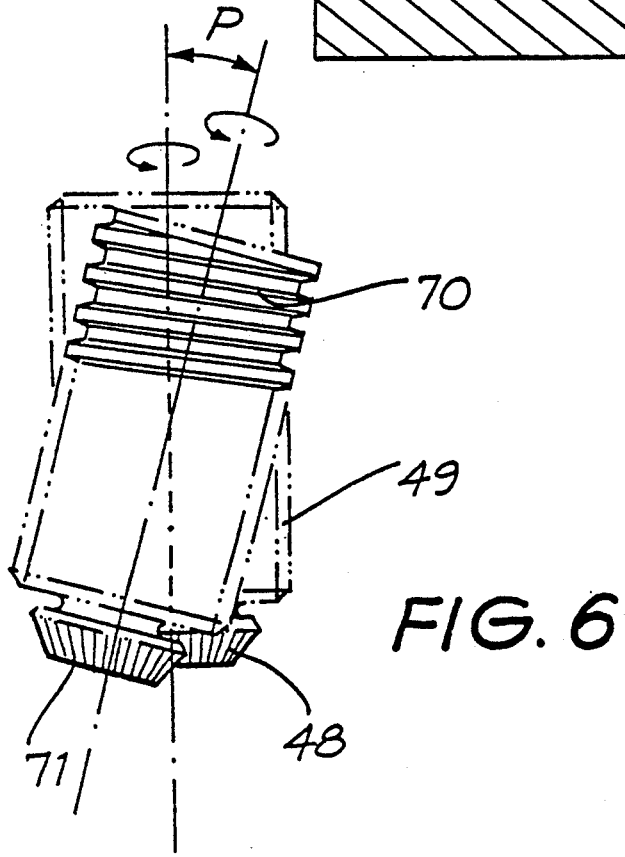
FIG. 6 is a plan detail of part of FIG. 5 as seen in the direction of the arrow 'B' in that figure, but with a less exaggerated mutual inclination of the axes of the members.

The mechanism shown in FIG. 5 comprises a first gear assembly 40 having a gear ratio of substantially 1:1, and a second gear assembly 41 having the same ratio. An input drive shaft 42 is rotated by a drive pinion 43 and has a gear wheel 44 rotatable upon it and providing phase displacement means. The gear wheel 44 forms the input side of the second gear assembly 41 having a built in backlash and meshes with an idler gear wheel 44A which meshes with a third gear wheel 45. The idler gear wheel 44A ensures that members, constructed as two cylindrical locking gears 49 and 70 rotate in the same direction. A spring 46 extends chordally between the pinion 43 and the gear wheel 44 and serves exactly the same function as the spring 19 shown in FIG. 2.

The left hand end of the shaft 42 carries a crown gear 47 which meshes with a face gear 48 integrally formed with member providing a helical cylindrical gear 49. A second member providing a helical cylindrical gear 70 meshes with the gear 49 to form the first gear assembly 40 and carries a face gear 71. A crown gear 72 meshes with the face gear 71 and is attached to a shaft 73 extending parallel to the shaft 42. The right-hand end of the shaft 73 is attached to the centre of the gear wheel 45 and both shafts 42 and 73 pass through a mounting block 74.

As is apparent from FIGS. 5 and 6 the axes of the two cylindrical gears 49 and 70 are offset slightly with respect to one another in practice by several degrees, indicated by the angle 'P' FIG. 6. This offset is much exaggerated in FIGS. 5 and 6 for ease of understanding of the mechanism. As a result of this offset the pitch of the helical tooth of the cylindrical gear 70 is slightly larger than the pitch of the helical tooth of the cylindrical gear 49 so that the teeth remain in mesh when the members rotate. The helical teeth are so shaped that they remain in mesh, despite their axes of rotation not being exactly parallel. The gear ratio of the gear assembly 40 is not therefore exactly 1:1 but is quite close to it, i.e. it is substantially 1:1. If required, it can be exactly 1:1 by slightly changing the relative diameters of the gear wheels.

The pitch of the helices and the angular offset of the gear wheel axes enables synchronous complementary rotation of the gear wheels 49 and 70 to occur in either direction, i.e. they both either rotate clockwise or anticlockwise.

OPERATION OF FIFTH EMBODIMENT

The mechanism of FIGS. 5 and 6 operates as follows:

It is assumed that the mode of operation is one where the mechanism imposes no restraint on the rotation of the input drive obtained from pinion 43. The input drive splits at the second gear assembly 41 and part of it drives the shaft 42 and the remainder drives the shaft 73. These shafts transmit the drive to both cylindrical gears 49 and 70 so that they rotate about their axes. The slightly different speeds of rotation of gears 49 and 70 ensure that the axial spacing of their meshing teeth remains constant. Gears 49 and 70 both rotate in synchronism because of the applied drives obtained from the shafts 42 and 73.

If the gear wheel 44 is momentarily held against rotation the drive continues to be applied to the cylindrical gear 49 but is now stopped from reaching the shaft 73. The spring 46 simply extends. The two cylindrical gears 49 and 70 are prevented from axial displacement so that the axial propogation of the helical tooth of the rotating gear 49 in the meshing zone of the two helical teeth, is no longer matched by propogation of the helical tooth of the gear 70 which is no longer being driven. The helical tooth of the gear 49 now abuts the flank surface of the helical tooth of the gear 70 and is prevented by it from further axial propogation. The first gear assembly 40 therefore 'locks solid' in the sense that its members are incapable of rotating with respect to one another. The drive shaft 42 is thus prevented from further rotation until the tension in the spring 46 is relaxed.

The mechanism shown in FIG. 5 has the advantage that the gear ratios of both assemblies are almost 1:1, so that the meshing members rotate at nearly the same speed. Thus the use of members required to rotate at high rotational speeds is avoided.

MODIFICATION OF ABOVE DESCRIBED EMBODIMENTS

In the earlier embodiments the angular displacement necessary to switch the mechanism between its operating modes is obtained by using phase displacement means associated with the second gear assembly. This is not however essential as will be apparent from FIG. 7. The phase displacement necessary to shift the first gear assembly between its free-running mode and its "locked solid" mode of operation may be obtained by locating a phase changing device 80 into one of the shafts, preferably the shaft 81 which corresponds to the shaft 73 of FIG. 5. The device introduces a phase advance or lag or lost motion, between the two end sections of the shaft 81. Parts of FIG. 7 corresponding to parts of earlier figures serving the same purpose and already described, carry the same reference numerals and will not be again described.

DESCRIPTION OF THE SIXTH EMBODIMENT

FIG. 8 shows a mechanism of the invention designed as a clutch suitable for starting an endless conveyor system as shown in FIG. 13. This system comprises an endless belt conveyor 140 driven through a chain drive 139 and a starting clutch 141 from an electric motor 142. A characteristic of a belt conveyor is that it often requires to be started gradually and smoothly against a heavy load. A conventional clutch has the disadvantage that it has to dissipate a considerable amount of heat energy during the starting period, and the faces of the clutch plates are never directly exposed to a cooling medium of oil or air. Hence a normal clutch has a problem dissipating large quantities of heat.

The clutch 141 used for starting the conveyor as shown in FIG. 8 has an input drive shaft 110 extending into one side of an oil-filled casing 111, and an output drive shaft 112 protruding coaxially from the opposite side of the casing 111. The casing is filled with cooling oil.

A support 113 projects from one side of the casing beneath the shaft 110 and carries a first-order lever 114 capable of being turned as indicated by the arrow Y. It is also held rigidly in any position to which it is moved by means (not shown).

The lever 114 carries a yoke 115 at one end which grips a radial flange 116 provided at one end of a slide collar 117 mounted on the input shaft 110. The intermediate portion of the collar 117 is a sliding sealing fit in an aperture 118 in the casing 111, and the shaft 110 passes through a seal in the collar 117 so that it is free to rotate therein during axial movement of the collar 117 produced by the lever 114.

The collar 117 is provided inside the casing 111 with an annular grip 120. An annular flange 121, formed at one end of a geared sleeve 122, is held by the grip 120 so that, while the flange 121 is free to rotate, its axial displacement is constrained by the grip 120. The collar 117 and the sleeve 122 thus move axially together along the shaft 110 as a single unit.

The sleeve 122 is internally grooved so as to be movable along the splines 123 on the shaft 110. The splines 123 extend parallel to the axis of the shaft 110.

The sleeve 122 carries a gear 124 which meshes loosely with an idler pinion 125 of extended length. There is thus a designed backlash built into the mechanism. The pinion 125 rotates on a pin 126 attached to a rotatable frame 127, and its length is such that it engages the gear 124 at all axial positions of the sleeve 122 on the shaft 110.

The pinion 125 engages a second gear 128 attached to one end of a shaft 129 passing through a bearing 130 in the frame 127. The other end of the shaft 129 carries a cylindrical member 131 having a helical tooth 132 which conforms to that shown and described with reference to FIG. 12 so that it meshes with line, rather than point engagement. The design parameters which must be observed in order to obtain line engagement between the teeth 132 and 138, are explained in the specification with reference to the sketches of FIG. 12.

The shaft 110 has an enlarged end portion 135 in a bearing within the frame 127 and carries a second rotary locking member 137 which is identical to the member 131 and has a helical tooth 138 which meshes with the tooth 132. The two members 131 and 137 are axially parallel, as illustrated and provide a first gear assembly having a uni-directional drive characteristic. The gear 124, 125 and 128 provide a second gear assembly having the same speed ratio as the first gear assembly.

FIG. 9 shows in an exaggerated form, the engagement of the gears 124 and 128 with the pinion 125. This engagement includes a predetermined degree of backlash.

OPERATION OF THE CLUTCH OF THE SIXTH EMBODIMENT

The lever 114 determines the effective length of the shaft 110, which lies between the locking member 137 and the gear 124. The greater this length, the greater is the torsional flexibility provided by the shaft portion lying between the member 137 and the gear 124. Conversely, the shorter the shaft portion lying between the member 137 and the gear 124, the stiffer is the connection between them. The position of the lever 114 thus pre-determines the amount of torque needed from the input 110 to overcome the backlash in the second gear assembly.

As long as the gear lash present in the second gear assembly exceeds that of the first assembly, the locking member 131 is not driven, and prevents rotation of the locking member 137. In this operative mode, the casing 127 is spun about the axis of the shaft 110 by the incoming drive applied to the shaft.

When gear 124 is in the position illustrated, which corresponds to that of minimum torque, the amount of torque which has to be applied to the shaft 110 to twist it, in order to overcome the backlash of the second gear assembly is less than is necessary when the gear 124 is at the left-hand end of the spline 123. Progressive movement of the lever 114 causes the gear 124 to move to different positions on the spline 123, each such position representing a unique torque value which must be achieved by the input in order to overcome the backlash of the second gear assembly.

When the backlash of the second gear assembly has been overcome, drive is transmitted through it to the locking member 131. In this condition, the output torque of the shaft 112 is limited to a maximum determined by the position of the gear 124 on the spline 123. For each position, a torque less than that determined by the position of the gear 124, is transmitted to the output shaft 112. However, no torque greater than that which is determined by the position of the gear 124, can be delivered to the output shaft 112.

From the above description it will be understood that the mechanism of FIGS. 8 and 9 behave as an adjustable torque limiting device.

SEVENTH EMBODIMENT

The mechanism of FIG. 11 provides a mechanical switch having an on-mode and on off-mode. The mechanism comprises a base 411 which supports two axially parallel shafts 429 and 435. At one pair of ends, the shafts carry meshing locking members 432, 437, which together provide a first assembly. These locking members are similarly constructed to those referenced 138 and 132 in FIG. 8.

The other pair of ends of the shafts 435 and 429 respectively carry gears 451 and 450 of the same diameter. These gears have helical teeth, and an idler 452 meshes with them both. The idler is carried by a shaft 426 supported in a bearing 457. The gear 451 has a key 453 which is slidable along a slot 455 in the shaft 435. A spring (not shown) biases the gear 451 to the right in the figure, and against a nose 456 of a manually-controllable lever 454 pivotted to the base 411. The position of the gear 451 is thus controlled by the lever 454.

An input rotary drive to be controlled is applied to the shaft 410. The gears 451, 452 and 450 provide a second gear assembly, having some gearlash. The extent of gear lash between the gear tooth faces is thus controlled by the position of the gear 451.

When the second gear assembly is exhibiting gearlash in one direction, the input drive to the shaft 410 is prevented from rotation by the two locking members 437 and 432. The lash in the second gear assembly prevents the rotational drive of the shaft 410 being transmitted to the shaft 429 so that the locking member 432 cannot rotate. It therefore prevents the locking member 437 rotating also.

If the lever 454 is now moved in a direction which, as a result of the helical teeth of the gears 451, 452, reduces the lash in the second gear assembly to zero, the input rotary drive to the shaft 410 can now be transmitted through the second gear assembly to the locking member 432. It then rotates in synchronism, as the speed ratios of the first and second gear assemblies are arranged to be the same, and the resistance to the rotational drive is reduced virtually to zero.

EIGHTH EMBODIMENT

A frame 600 supports two parallel shafts 601, 602 which carry on one side of the frame 600 a pair of locking members 603, 604 constructed as already described with those referenced 432 and 437 in FIG. 11. The locking members turn freely in the same direction when driven by synchronous drives, but lock together if the drives cease to be synchronous.

The shaft 602 carries at its other end a gear wheel 606 arranged in the same plane as a second gear wheel 605 but spaced therefrom. An inextensible and non-slipping drive belt 607 extends around the two gear wheels 605, 606 so that they are driven together by a rotational input drive applied to an input shaft 608 which is coaxially arranged with respect to the shaft 601.

A 'lazy' joint is provided between the shafts 601 and 608 by a pin 610 which extends radially from an end-portion 611 of the shaft 601 surrounded by a hollow portion 612 of the adjacent end of the shaft 608. The hollow portion 612 has an arcuate cut-away portion 613 which is longer than the diameter of the pin 610 so that rotational movement of the shaft 608 is not transmitted to the shaft 601 until the pin 610 engages one or other end faces 614 of the cut-away portion 613.

A tensioning pulley 615 is resiliently pressed by a spring 616 against one of the two runs of the belt 607 between the two gear wheels 605, 606, and is adjusted to set the belt or chain 607 to a desired tension.

Before drive is applied to the shaft 608, the pin 610 is forced by the belt tension produced by the spring 616, against one or other end face 614. In this condition of the mechanism, drive is not transmitted from the shaft 608 to the shaft 601, and thus the locking member 604 prevents the locking member 603 from rotating.

If the torque of an applied drive to the shaft is gradually increased in one direction (shown arrowed) the tension in the belt between the driven wheel 605 and the undriven wheel 606 progressively increases and the spring 616 yields to allow the gear 605 to turn. This turns the cut-away portion 613 with respect to the pin 610 until it is engaged by the end face 614 from which the pin 610 was previously spaced. When this occurs, the rotational drive from the shaft 608 is applied through the 'lazy' joint to the shaft 601 so that the two locking members 604 and 603 are now driven at synchronous speeds and in the same direction to allow the input rotational drive to turn freely.

The input drive torque necessary to allow the input drive to turn is adjustable by altering the compression of the spring 616.

NINTH EMBODIMENT

FIG. 14 shows an embodiment of the invention utilising a lost motion device to control it. The mechanism comprises a housing 500 having an input shaft 501 on one side, which is co-axially arranged with respect to an output shaft 502 on the other side. The shaft 502 extends to a housing 503 mounted inside the casing and containing a pair of meshing locking members 504, 505 having parallel axes and of the form described above, with reference to FIGS. 10 and 11.

The locking members 504, 505 are mounted on respective shafts 506, 507, which extend rotatably through the wall of the housing 503, and carry at their protruding ends, respective gears 508, 509. These gears are of the same diameter.

Gear 508 meshes with a gear 510 of the same diameter and carried by a shaft 511 mounted in a bearing in the housing 503. The end of the shaft 511 is connected by a torsional device shown generally at 512, to the inner end of the input shaft 501.

The torsional device 512 has two opposed abutment faces 514, 520 between which extends an arcuate spring 513 as shown in FIG. 14A. One of the abutment faces 514 is mounted on the shaft 511, and the other abutment face 520 is mounted on the shaft 501.

A gear 515 of the same diameter as the gears 508 and 510 is rotatably mounted on the shaft 501, and has a saw-tooth projection 517 extending from one side. The shaft 501 carries a radial pin 518, which is movable to different positions along a slot 519, so that it engages a different part of the ramp surface of the tooth 517 in accordance with its axial position in the slot 519.

The mechanism of FIG. 14 operates as follows: Assume that a given load is connected to the output shaft 502, and a progressively increasing torque is applied to the input shaft 501. This torque attempts to compress the spring 513. It cannot turn the shaft 511, because the two gears 508, 510 are in mesh with one another, and the gear 508 is connected by the shaft 506 to the locking member 504. This is in mesh with the locking member 505, which, at this time, has no drive applied to it, as there is no driving connection between the shaft 501 and the gear 515.

As the input torque on the shaft 501 increases, the spring 513 is progressively compressed, and the pin 518 moves towards the ramp surface of the tooth 517. The amount of movement which occurs before it engages the ramp surface, is determined by the axial position of the pin 518 in its slot 519.

In due course, the input torque on the shaft 501 increases to a value at which the spring 513 is compressed sufficiently for the pin 518 to engage the ramp surface of the tooth 517. When this occurs, the rotation of the shaft 501 is transmitted to the gear 515 and thus to the gear 509 and the locking member 505. This causes the locking member 505 to rotate in synchronism with the locking member 504, so that no further increase in torque to that determined by the compression of the spring 513 can be delivered to the output shaft 502. The compression of the spring is determined by the adjustable lost motion occurring before the pin 518 engages the sawtooth 517, and thus the torque delivered by the mechanism is a function of the position of the pin 518 in the slot 519. Until the pin engages the ramp surface of the tooth 517, the input drive from the shaft 501 is transmitted through the two gears 508 and 510 and the shaft 506 to the housing 503, and thus to the output shaft 502.

We claim:

1. A mechanism for controlling a rotary drive and having different modes of operation, including two rotary members equipped with teeth which pass through a common meshing zone with rotation of the members, the teeth being shaped and positioned on the members to remain in mesh while being incapable of transmitting drive in at least one direction between the two members; in which mechanism both members are connected to be driven in synchronism, and means are provided to change the mode of operation of the mechanism by altering the drive to one of the members with respect to the other member.

2. A mechanism as claimed in claim 1, in which the means operates by altering the relative phase angle between the synchronising drives of the members.

3. A mechanism as claimed in claim 2, in which the two rotary members provide a first assembly, the synchronising drives are obtained from two inputs of a second assembly of gears having the same speed ratio as the first assembly, and means are provided which are operable between three positions at the first of which the teeth of one gear of the second assembly bear on flank surfaces of the teeth of a second gear of the assembly; at the second position of the means, the teeth of the two gears are non-contiguous in their meshing zone; and, at the third position of said means, the teeth of said one gear bear on the flank surfaces of the teeth of the second gear opposite to those on which they bore when said means was at the first position.

4. A mechanism as claimed in claim 1, in which the members are both formed with teeth spiralling around their respective axes of rotation which are arranged parallel, or substantially parallel to one another.

5. A mechanism as claimed in claim 1, in which the members are submerged in a liquid.

6. A mechanism as claimed in claim 1, in which an input rotary drive is split between two drive paths respectively for driving the two members at synchronous speed, and said means are pre-settable to vary the point at which the change in the mode of operation of the mechanism occurs.

7. A mechanism as claimed in claim 1, in which the teeth of the two members are configured to provide line contact engagement between their surfaces when they are brought into touching contact with one another in the meshing zone.

8. A mechanism as claimed in claim 1, in which said means is responsive to the torque exerted by the rotary drive.

9. A mechanism as claimed in claim 8, in which said means includes a component which flexes resiliently in response to a change in the torque exerted by an applied drive.

10. A mechanism as claimed in claim 9, in which said component comprises a spring-biased element engaging one run of an inextensible and non-slipping drive belt or chain passing around two spaced gear wheels through which the synchronising drives are respectively applied to said rotary elements.

11. A mechanism as claimed in claim 10, in which the spring bias applied to said element is adjustable to vary the tension in the belt or chain run it engages.

12. A mechanism as claimed in claim 1, in which said rotary members turn in the same direction when synchronously driven, and have teeth which sprial in the same direction around the axes of rotation of the members.

13. A mechanism as claimed in claim 1, in which the rotary members have a 1:1 speed ratio.

14. A mechanism as claimed in claim 1, in which the members are provided by a worm-and-wheel assembly.

15. A mechanism as claimed in claim 1, in which the teeth of the two members are designed to be incapable of transmitting drive through the meshing zone between them in both directions of input drive.

16. A mechanism as claimed in claim 1, in which the means operates to increase, in a controlled manner, the pressure exerted between the contiguous teeth of the two members so that as they rotate, an increasing amount of frictional heat is generated between them.

17. A mechanism as claimed in claim 1, in which the members have teeth which spiral in opposite directions respectively and lie on the surfaces of two axially parallel, cylindrical envelopes, the members being turned in unison in the opposite direction to one another by an applied rotary drive so that when the members are rotated in synchronism in opposite directions respectively, their teeth propogate at the same speed and in the same direction through the meshing zone between the members.

18. A gear mechanism provided with two gear assemblies having the same gear ratio and each having an input side and an output side, one side of each assembly being connected to be turned by a rotational drive applied to the mechanism from an external source, and the remaining two sides being interconnected so that they rotate together; the first gear assembly having unidirectional drive characteristics, and means being provided which are selectively operable to introduce a lost motion between the two assemblies whereby in one mode of operation of the mechanism both gear assemblies are driven by the external source and rotate together, and in a second mode of operation of the mechanism the lost motion prevents one gear assembly from operating so that the mechanism locks solid and the externally applied drive is obstructed.

19. A mechanism as claimed in claim 18, in which the lost motion means comprises a phase-displacement means.

20. A mechanism as set forth in claim 19, in which the phase displacement means is a device positioned in a drive connection, extending between said remaining two sides of the gear assemblies.

21. A mechanism as claimed in claim 18, in which the gear assemblies have a speed ratio to one another of 1:1.

22. A mechanism as claimed in claim 18, in which at least one of the gear assemblies is a worm-and-wheel.

* * * * *